United States Patent [19]
Puruya

[11] 3,849,744
[45] Nov. 19, 1974

[54] BASE-BAND DELAY EQUALIZER

[75] Inventor: Tadashi Furuya, Tokyo, Japan

[73] Assignee: Nippon Electric Company, Limited, Tokyo, Japan

[22] Filed: Apr. 24, 1973

[21] Appl. No.: 354,054

[30] Foreign Application Priority Data
May 4, 1972 Japan ............................... 47-44822

[52] U.S. Cl. ............ 333/28 R, 179/15 AN, 325/65
[51] Int. Cl. ............................................ H03h 7/16
[58] Field of Search ............ 333/28 R; 178/DIG. 12; 179/1 P, 15 AN; 330/149; 325/46, 65

[56] References Cited

UNITED STATES PATENTS 2,430,978 11/1947 Foster ........................... 325/46 UX
3,422,378 1/1969 LaRosa ............................ 333/28 R

*Primary Examiner*—Paul L. Gensler
*Attorney, Agent, or Firm*—Sughrue, Rothwell, Mion, Zinn & Macpeak

[57] ABSTRACT

A base-band delay equalizer for compensating for envelope delay distortion in angle modulation transmission systems such as FDM-FM multiplex telephone signal transmission, FM color television signal transmission or the like is disclosed. The base-band signal, which may be either the signal prior to angle modulation or subsequent to angle modulation, is applied to the delay equalizer which produces an envelope delay time which varies as a function of the base-band signal voltage. The base-band delay equalizer includes a variable-capacitance, such as a variable-capacitance diode, whose capacitance varies with the voltage of the input base-band signal.

5 Claims, 9 Drawing Figures

BASE-BAND DELAY EQUALIZER

BACKGROUND OF THE INVENTION

1. Field of the Invention

This invention relates to a base-band delay equalizer for compensating for envelope delay distortion in an angle modulation (FM or PM) transmission system.

2. Description of the Prior Art

FM transmission systems are widely in use in microwave communications for the purpose of transmitting multiplex telephone signals or television signals. In an FM transmission system, the envelope delay time versus frequency characteristic in a required FM bandwidth must be maintained as flat as possible for the multiplex telephone signal or the television signal (particularly, the color television signal) to be faithfully transmitted over its channels. If this characteristic is not sufficiently flat, so-called pseudo-crosstalk noise is caused when the system is in use for the transmission of multiplexed telephone signals. This pseudo-crosstalk noise attributable to the uneven delay time vs. frequency characteristics of the transmission system increases with the increase in the frequency of the modulating signal. Hence, in a super-multiplex telephone signal transmission system with a capacity, for example, of 1,800 or 2,700 channels, it is extremely important to equalize the envelope delay time for all frequency components over the required FM band or, in other words, to flatten the above-mentioned delay vs. frequency characteristics. The flattened characteristic is important for the transmission of color television signals because even a slight dependence of delay distortion on frequency adversbly affects the luminance signal, so that the hue of the reproduced picture is affected, hampering the faithful transmission of color television signals.

To flatten the envelope delay time versus frequency characteristic over the required transmission band, various types of delay equalizers have been proposed. These conventional equalizers employ, at the i.f. stage or at the microwave frequency stage, a so-called all-pass network whose amplitude versus frequency characteristic is flat and the delay time versus frequency characteristic is suitably curved. This conventional approach requires the use of ganged variable-capacitors or variable-inductors in the all-pass network, in order to vary the envelope delay time versus frequency characteristic while maintaining the amplitude versus frequency characteristic flat. This method, however, has drawbacks. For example, the equalizer circuit is complicated and the capacitance or the inductance cannot be adjusted over a sufficiently wide range. Furthermore, because this all-pass network is used either in the i.f. region, e.g., the 70 MHz or 140 MHz or in the microwave frequency region, e.g., the 4 GHz or 6 GHz region, the constants of the circuit elements used must be exactly adjusted to the specified values through a number of steps.

SUMMARY OF THE INVENTION

An object of the present invention is to provide a delay equalizer capable of compensating for the differential phase distortion in an FM transmission system, without complicating the circuit design and the adjustment process involved.

The invention features the use of a delay equalizer having a variable-capacitance diode at the base-band stage to compensate for the differential phase distortion. This is in contrast to the conventional delay equalizer which is inserted at the microwave stage or at the i.f. stage. The term "base-band signal" refers to those signals in the stage before the angle modulation or after angle demodulation, which include multiplexed audio signals, frequency-division multiplex telephone signals, video signals, and time-division multiplex signals.

BRIEF DESCRIPTION OF THE DRAWING

The present invention will now be described in conjunction with the accompanying drawings, in which.

DESCRIPTION OF THE PREFERRED EMBODIMENTS

Figure 1:
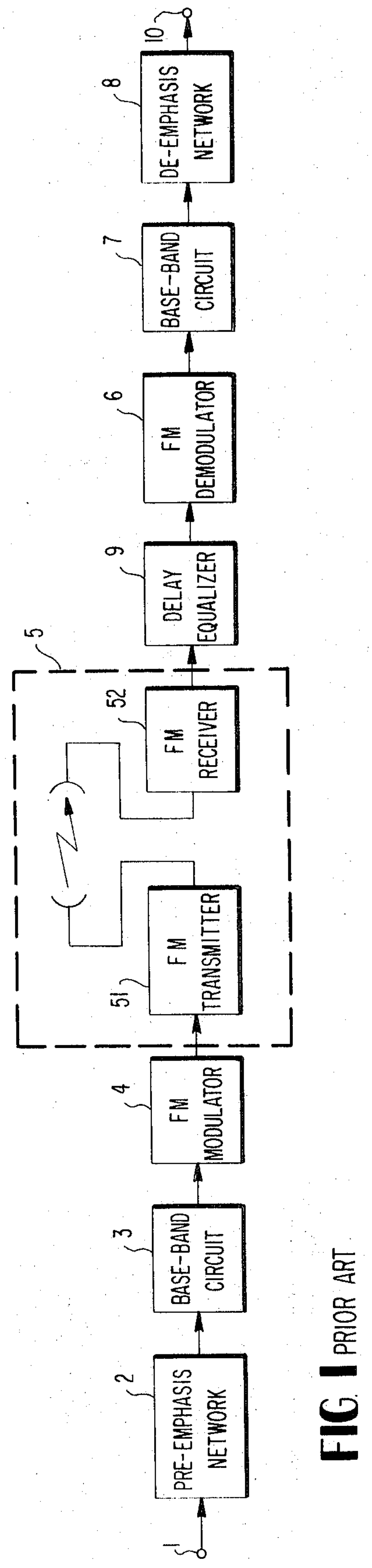
FIG 1 PRIOR ART
FIG. 1 is a block diagram showing an FM signal transmission system having a conventional delay equalizer.

Referring to FIG. 1 showing the conventional FM transmission system with the conventional delay equalizer, the reference numeral 1 denotes an input terminal of the base-band signal to be transmitted over this system; 2, a pre-emphasis network for emphasizing the high frequency components; 3, a base-band signal transmission circuit including an amplifier for the output of the pre-emphasis network 2; 4, a frequency modulator (FM modulator) for frequency-modulating a carrier wave by the amplified base-band signal; 5, an FM signal transmission path with an FM transmitter 51 and an FM receiver 52 disposed at its ends; 6, an FM signal demodulator (FM demodulator) for demodulating the supplied signal into a base-band signal; 7 a base-band signal transmission circuit including an amplifier for the base-band signal; 8, a de-emphasizing network for de-emphasing the high-frequency components of the amplified base-band signal; and 10, an output terminal for the de-emphasised signal. In this conventional system, a delay equalizer 9 is incorporated into the i.f. stage which precedes the demodulator 6. This delay equalizer 9 consists essentially of a constant impedance symmetrical lattice circuit or the equivalent circuit, operated so as to compensate for the differential phase distortion due to the FM signal transmission path 5.

As shown in FIG. 1 (*a*), one example of the conventional delay equalizer 9 has a bridged T-type all-pass network. A lattice equivalent of this network is as shown in FIG. 2 (*b*).

These networks provide a constant input impedance and constant amplitude response for all frequency components if the inductances and capacitances are in the following relations:

$$\sqrt{L_1/C_2} = \sqrt{L_2/C_1} = R_o$$

When this envelope delay equalizer is used as an easily adjustable equalizer, the adjustment of the circuit constants $L_1$, $L_2$, $C_1$ and $C_2$ should be made maintaining the relationship expressed in the above equation. For that purpose, the inductive and capacitive elements must be in ganged structures, respectively, and practically, this is very hard to manufacture.

Figure 3:
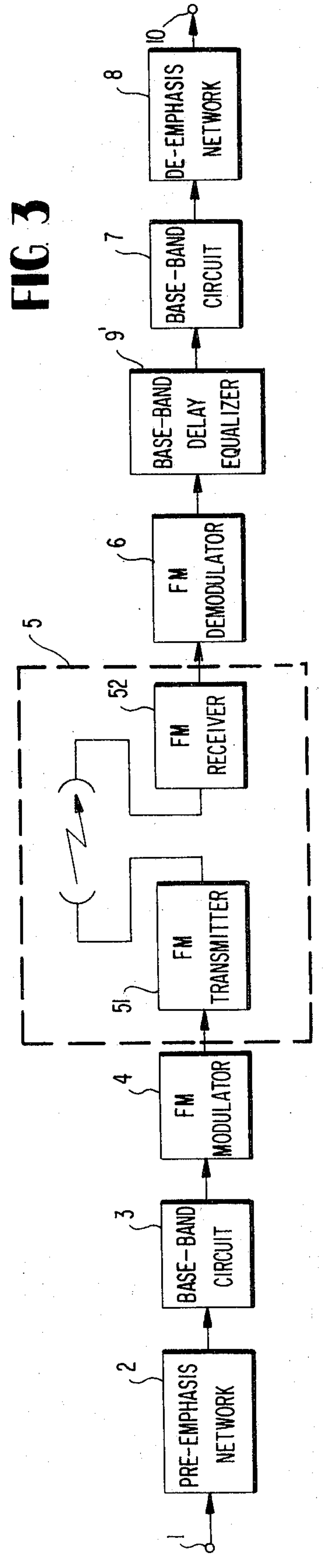
FIG. 3 is a block diagram showing an FM signal transmission system having a base-band delay equalizer of this invention.

In FIG. 3 showing the FM signal transmission system having the base-band delay equalizer of this invention, like reference numerals show like constituents as in FIG. 1. The numeral 9' stands for the base-band delay equalizer of the invention to be inserted at the base-band signal output circuit of the stage, which comes after the demodulator 6.

Figure 4:
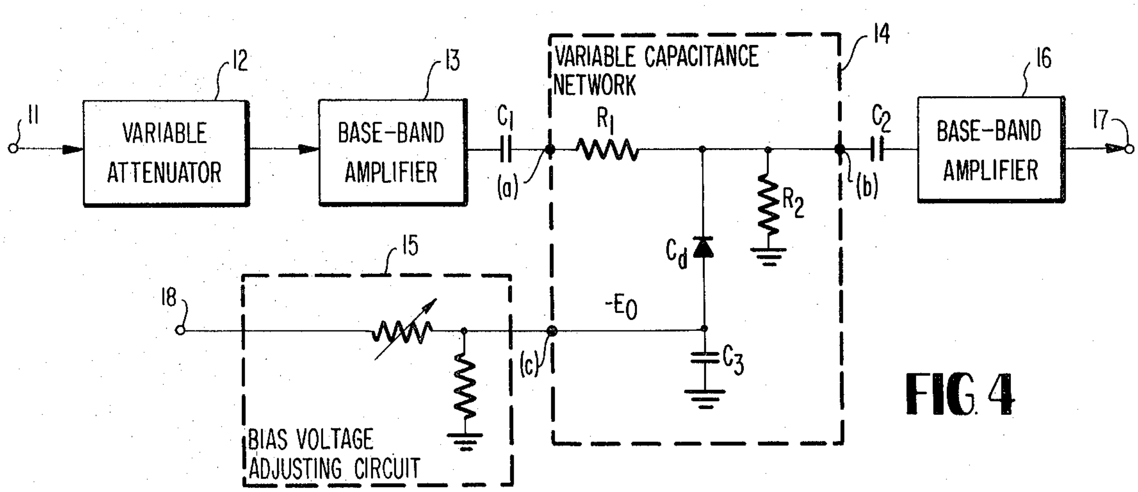
FIG. 4 is a diagram showing a preferred form of the base-band delay equalizer of the invention.

Referring to FIG. 4 showing the circuit diagram of the base-band delay equalizer of FIG. 3, the base-band signal from the input terminal 11 passes through a variable attenuator 12, is amplified by a base-band signal amplifier 13 and is applied to the input side of a variable capacitance network 14. This network 14 has a circuit having a variable-capacitance diode Cd whose capacitance is varied with the voltage of the input base-band signal. On the other hand, the bias voltage,-$E_o$, supplied to the diode Cd from the terminal 18 is adjusted by a bias voltage adjusting circuit 15. The signal output from the variable capacitance circuit 14 is amplified by a base-band signal amplifier 16 and then delivered to the output terminal 17.

In this circuit of FIG. 4, $C_1$, $C_2$ and $C_3$ are capacitors of large capacitances to exhibit small impedances to the base-band signal. If the junction capacity Cd of the variable-capacitance diode is sufficiently smaller than the capacity $C_3$ ($Cd << C_3$), the relationship between the signal voltage $v_i$ at the point ($a$) and the signal voltage $v_o$ at the point ($b$) is expressed as $$\frac{v_o}{v_i}=\frac{\left(\frac{R_2}{1+j\omega CdR_2}\right)}{R_1+\left(\frac{R_2}{1+j\omega CdR_2}\right)}=\left\{\frac{R_2}{(R_1+R_2)}\right\}\cdot\left\{\frac{1}{1+j\omega Cd\left(\frac{R_1R_2}{R_1+R_2}\right)}\right\}$$

where $\omega$ is equal to $2\pi f$, and $f$ stands for the frequency of the base-band signal.

This indicates that $v_o$ is phase-retarded by $\tan^{-1}\omega Cd\, R_1R_2/R_1+R_2$ with respect to $v_i$. The phase characteristic $O(\omega)$ of the circuit portion ranging from the input point ($a$) to the output point ($b$) of the network 14 is given by:

$$O(\omega) = -\tan^{-1}\omega Cd(R_1R_2/R_1 + R_2) \quad (1)$$

Therefore, the envelope delay time $\tau$ of the above-mentioned ($a$) - ($b$) circuit portion toward the base-band signal is given by:

$$\tau=\frac{-d\sigma}{d\omega}=\frac{Cd\left(\frac{R_1R_2}{R_1+R_2}\right)}{1+\left\{\omega Cd\left(\frac{R_1R_2}{R_1+R_2}\right)\right\}^2} \quad (2)$$

When Cd, $R_1$ and $R_2$ are determined to satisfy $\omega Cd(R_1R_2/R_1 + R_2) <<1$ in the frequency band of the base-band signal to be transmitted, the envelope delay time $\tau$ is given by $$\tau \approx Cd(R_1R_2/R_1 + R_2) \quad (3)$$

It is apparent from Eq. (3) that the delay time $\tau$ is proportional to the junction capacity $Cd$ of the variable-capacitance diode.

Figures 5, 7:
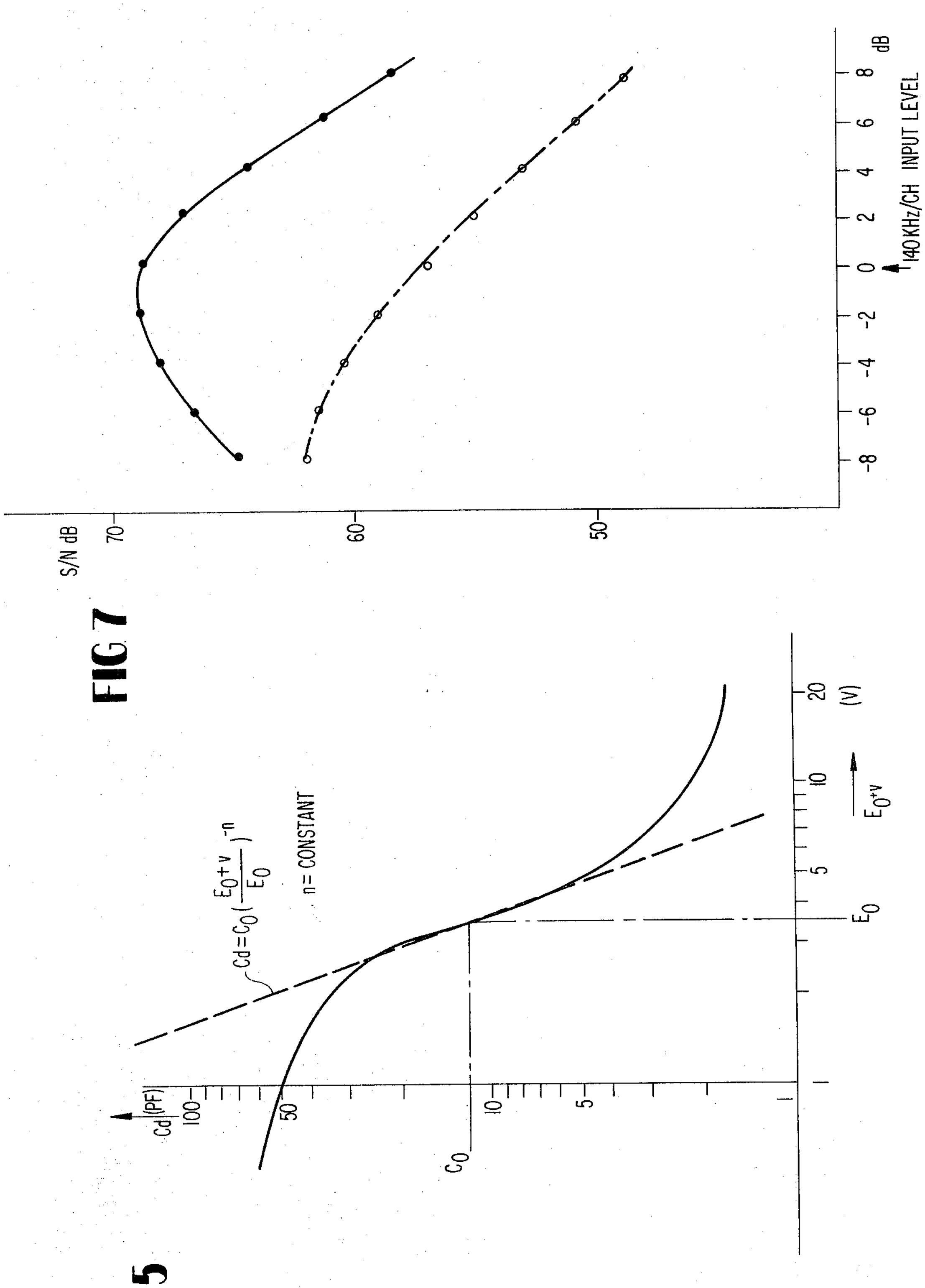
FIG. 5 shows the junction capacity vs. terminal voltage characteristic of a variable capacitance diode used in the delay equalizer of the invention.
FIG. 7 shows a characteristic curve showing the technical advantage of the base-band delay equalizer of this invention.

In FIG. 5, in which the abscissa stands for the terminal voltage of the variable-capacitance diode, and the ordinate signifies the junction capacity $Cd$, the curve in solid line indicates a capacitance vs. input voltage character. It will be noted that there are many types of variable-capacitance diodes exhibiting characteristics as shown and suited for the network 14 of the present invention. More specifically in FIG. 5, $E_o$ denotes the d.c. bias voltage applied across the variable-capacitance diode; $v$, the base-band signal voltage applied across the variable-capacitance diode $Cd$; and $C_o$, the junction capacity when $v$ = O. A hyperabrupt junction variable-capacitance diode having the constant $n$ larger than or equal to 2 ($n \geqq 2$) in a certain bias voltage range is available as an element suited for this purpose. As shown in the drawing, the change in the junction capacity $Cd$ can be approximated by a logarithmic straight line (as indicated by the broken line) for a certain range of the applied voltage in the vicinity of the terminal voltage $E_o$ of the variable-capacitance diode. In other words, as long as the applied voltage is in the vicinity of $E_o$, the junction capacity $Cd$ can be approximated by a function of the voltage ($E_o + v$) across the diode, according to the following Eq. (4):

$$Cd = Co\ (E_o + v/\ E_o) \quad (4)$$

Substituting Eq. (4) for Eq. (3), $$\tau = Co\ (1 + v/\ E_o)^{-n}\ (R_1R_2/R_1 + R_2) \quad (5)$$

For simplicity, it is assumed that $v$ and $E_o$ are determined so that $v/E_o$ <<1. Then, $$\tau = Co\ (1 - n\ v/\ E_o)\ (R_1R_2/R_1 + R_2) \quad (6)$$

Thus the delay time $\tau$ from the point ($a$) to ($b$) is given by Eq. (6), which includes the term varying as the ratio of the base-band signal voltage to the bias voltage (i.e., $v/E_o$) applied across the variable-capacitance diode. Therefore, by suitably determining the ratio ($v/E_o$), the polarity of $v$, and $R_1$ and $R_2$ with respect to Co and $n$, it becomes possible to obtain the desired envelope delay time proportial to $v$ or $-v$.

The instantaneous amplitude of the base-band signal voltage $v$ corresponds to the instantaneous frequency of the FM signal being transmitted over the FM transmission path. Therefore, if the envelope delay time vs. frequency characteristic in the FM transmission path is not sufficiently flat, the corresponding phase distortion attributed to the envelope delay distortion may be evaluated in terms of the delay time vs. base-band signal voltage characteristics. Then, if the variation in the envelope delay time viewed between the points ($a$) and ($b$), which is dependent upon the base-band signal voltage $v$, is adjusted so that such distortion attributable to the unflattened delay characteristics in the FM transmission path of FIG. 3 is canceled, then the distortion of the signal transmitted over the FM transmission system extending from the base-band signal input terminal 1 to the output terminal 10 can be compensated.

The amplitude versus frequency characteristic of the circuit section from point (*a*) to (*b*) for the base-band is almost flat when $\omega Cd(R_1R_2/R_1 + R_2) << 1$.

The junction diode $Cd$ exhibits a nonlinear characteristic against $v/E_0$. Hence, it is possible to obtain a delay time versus signal voltage characteristic which varies with the square of v or $-v$ or higher order terms.

Figure 6A:
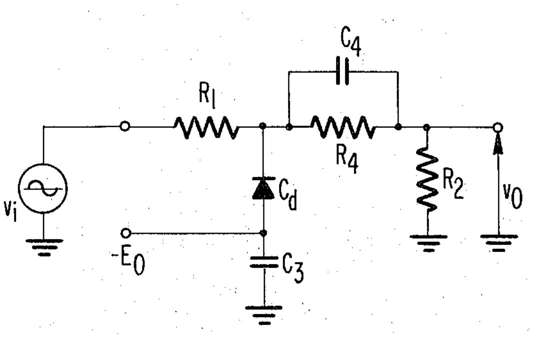
FIG. 6 (*a*) and (*b*) show modifications of base-band delay equalizer of the invention.
Figure 6B:
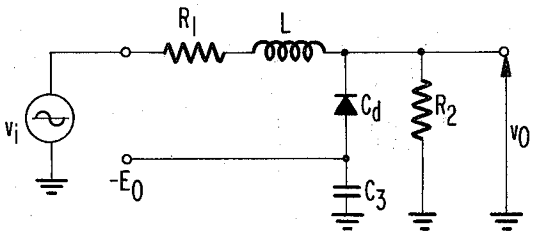

The circuit 14 of FIG. 4 has been shown by way of example and not as a limitation. It will be seen that various modifications can be made thereof. The circuits shown in FIGs. 6*a* and 6*b* are examples of such modifications of the invention. In the circuit of FIG. 6*a*, a capacitor $C_4$ and a resistor $R_4$ are additionally employed for the purpose of improving the transmission characteristic in the base-band. While, in the circuit of FIG. 6 (*b*) a low-pass filter comprising L and $Cd$ is employed. In FIGS. 6*a* and 6*b*, $C_3$ is a bypass capacitor with a sufficiently large capacitance. It is apparent that these circuits are designed so that the envelope delay time for the output base-band signal $v_o$ with respect to the input signal $v_i$ includes the term dependent on the base-band signal voltage applied across the variable-capacitance diode $Cd$. Instead, a capacitor of a fixed capacitance may be additionally inserted in series or in parallel to the variable-capacitance diode to vary the envelope delay time versus signal voltage characteristic.

The principles of the invention have been described above in connection with the operation where the non-flat envelope delay characteristic of the FM signal transmission path of the FM transmission system is compensated by the use of the compensating means in the base-band signal transmission path. In this operation, the instantaneous voltage of the base-band signal corresponds to the instantaneous frequency of the FM signal in a certain proportional relationship. This is the explanation given to the operation known as the so-called quasi-static operation. This concept may intuitively be generally accepted, when the modulation index of FM signal is large. However, if the modulation index is small, for example, if a 2,700-channel multiplex telephone signal is transmitted under the FDM-FM system, the modulation index is very small since the frequency deviation per channel in the intermediate frequency band is 140 KHz rms, and the frequency of the highest channel in the base-band is 12,336 KHz. In such case, the above-mentioned proportional relationship regarding FM signal may not intuitively be perceived merely in view of the quasistatic concept. Whereas, it has been experimentally proved that the system of the invention is effectively workable on FM signals of small modulation index.

FIG. 7 shows an example of noise-loading test results measured with the base-band delay equalizer of the invention applied to a 2,700-channel multiplex telephone signal transmission system of FDM-FM. In FIG. 7, the abscissa indicates in decibels the white noise loading level which is simulating a 2,700-channel multiplex telephone signal to the base-band signal input on the transmission side. Zero decibel is the reference level necessary to effect the frequency deviation of 140 KHz rms/ch in the intermediate frequency band. The ordinate indicates in decibels the unweighted signal-to-noise ratio at 12,150 KHz slot of the highest channel in the base band of the base-band signal output on the receiving side. The curve in dotted line shows the signal-to-noise ratio at 12,150 KHz slot-band measured of the FM transmission circuit which has an envelope delay distortion of approximately $4ns/\pm 13$MHz. The solid line shows the signal-to-noise ratio at the same frequency slot-band measured of the same FM transmission circuit, after the envelope delay has been equalized by using the base-band delay equalizer of this invention. It will be apparent that almost all of the second order envelope delay distortion is equalized by the present base-band delay equalizer very effectively.

While the system structure of FIG. 3 shows the base-band delay equalizer disposed after the FM demodulator, the same objective can be achieved by disposing the delay equalizer before the FM modulator. When a base-band repeater (demodulation type repeater) is included in the FM transmission system, the system of the invention can also be applied to the base-band circuit of such repeater.

In short, the base-band delay equalizer of this invention, adapted to the base-band circuit and simple in structure, is capable of compensating for the signal distortion attributable to the envelope delay. Thus, the base-band delay equalizer of this invention is particularly useful for a wide-band FDM-FM multiplex telephone signal transmission, as well as for FM color television signal transmission.

I claim:

1. A base-band delay equalizer for equalizing delay time for all the frequency components of a base-band signal of broad frequency bandwidth to be transmitted over an angle modulation transmission system, said equalizer being disposed at the base-band signal circuit of at least one of the transmitting or receiving ends of said transmission system and comprises in combination:

a variable-capacitance diode having a capacitance controllable in response to the voltage of said base-band signal applied thereto, input means for supplying to said variable-capacitance diode said base-band signal, output means for deriving from said variable-capacitance diode a delay-compensated base-band signal, said variable-capacitance diode being connected in shunt between said input and output means and ground, a first resistor connected in series between said input means and the junction of said variable-capacitance diode with said output means, a second resistor connected in common to said variable-capacitance diode and said output means and in shunt to ground such that the envelope time delay is approximated by $$C_d\ (R_1R_2/R_1 + R_2)$$

where $C_d$ is the junction capacity of said variable-capacitance diode and $R_1$ and $R_2$ are the resistances of said first and second resistors, respectively, and bias means for supplying to said variable-capacitance diode a direct-current bias voltage so as to set the non-input capacitance of said variable-capacitance diode at a suitable value.

2. An equalizer as recited in claim 1, further comprising: a third resistor connected in series between said first resistor and said output means and a capacitor connected in parallel to said third resistor, said third resistor and capacitor being operative to improve the transmission characteristic of said equalizer in the base-band.

3. An equalizer as recited in claim 1, wherein said bias means comprises a large capacitance capacitor connected in series with said variable-capacitance diode and ground, and variable d.c. bias voltage source connected to the junction of said capacitor and said variable-capacitance diode.

4. An equalizer as recited in claim 1, further comprising: a low-pass filter connected in series between said first resistor and said output means, said low-pass filter being operative to improve the transmission characteristic of said equalizer in the base-band.

5. An equalizer as recited in claim 4, wherein said low-pass filter comprises the capacitance of said variable-capacitance diode and an inductor connected in series between said first resistor and said junction.

* * * * *

UNITED STATES PATENT OFFICE
CERTIFICATE OF CORRECTION

Patent No. 3,849,744 Dated November 19, 1974

Inventor(s) Tadashi FURUYA

Figure 2A:
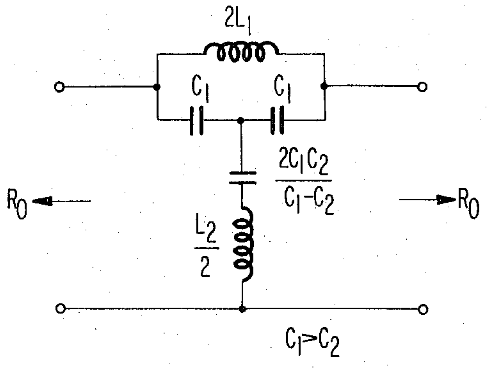
FIG. 2a PRIOR ART
FIGS. 2*a* and 2*b* are circuit diagrams showing an example of the conventional delay equalizer used in the transmission system of FIG. 1.
Figure 2B:
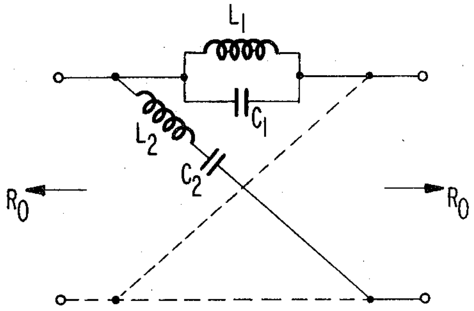
FIG. 2b PRIOR ART

It is certified that error appears in the above-identified patent and that said Letters Patent are hereby corrected as shown below:

IN THE SPECIFICATION:

Column 2, line 63 - delete "Fig. 1(a)" and substitute -- Fig. 2(a) --

Column 3, line 7 - delete "maintaing" and substitute -- maintaining -- line 53 - delete "$\Theta(\omega)$" and substitute -- $\Theta(\omega)$ -- line 57 - delete "$O(\omega)$" in first portion of the equation and substitute - $\Theta(\omega)$ -- line 65 - delete "$\Gamma = \frac{-d\sigma}{d\omega'}$" in first portion of the equation and substitute -- $\mathcal{T} = \frac{-d\Theta}{d\omega}$ --

Column 4, line 55 - delete "proportial" and substitute -- proportional --

Signed and sealed this 8th day of April 1975.

(SEAL)
Attest:

RUTH C. MASON
Attesting Officer

C. MARSHALL DANN
Commissioner of Patents
and Trademarks